UNITED STATES PATENT OFFICE.

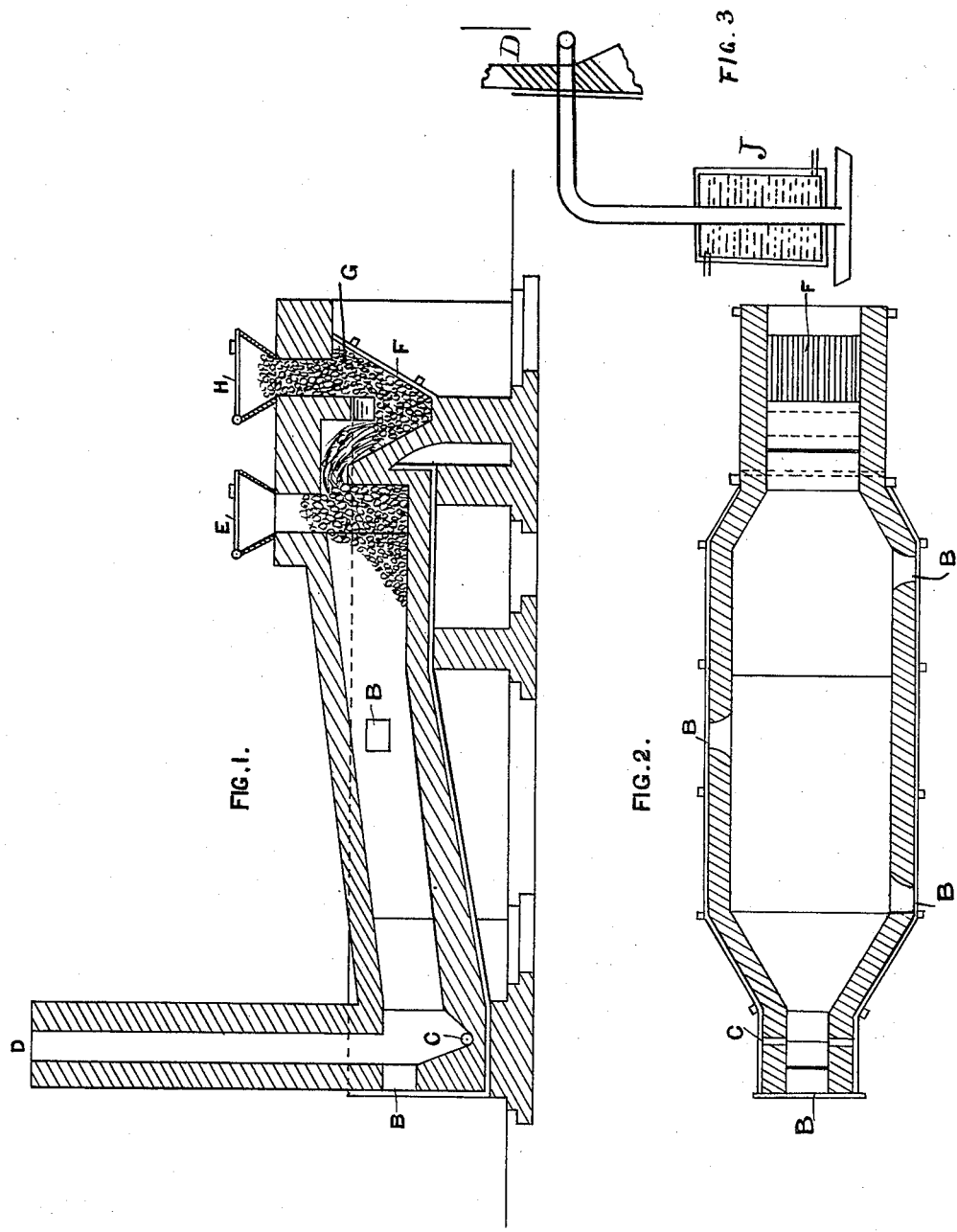

JOHN ARMSTRONG, OF LONDON, ENGLAND.

PROCESS OF TREATING COMPLEX ORES.

SPECIFICATION forming part of Letters Patent No. 607,817, dated July 26, 1898.

Application filed April 22, 1897. Serial No. 633,240. (No specimens.)

*To all whom it may concern:*

Be it known that I, JOHN ARMSTRONG, a subject of the Queen of Great Britain, residing at Acton, London, England, have invented certain new and useful Improvements in Processes of Treating Complex Ores, Mattes, and the Like and in Furnaces Therefor, of which the following is a specification.

This invention has for its principal object the reduction of complex sulfid ores, regulus, or mattes rich in precious metals, but which have hitherto resisted the efforts of metallurgists to economically extract their valuable metallic constituents. It is known that the reduction of these ores and mattes can be at once effected by metallic sodium or potassium; but the cost of these reagents is prohibitory. Now I accomplish the same result by the use of nascent sodium or potassium or, what is equivalent, the use of such mixtures and under such conditions as would cause sodium or potassium to be reduced but for the presence of the ore operated upon. I accordingly add to the raw or mixed roasted and raw pulverized or other matte (1) carbonate or nitrate or cheap organic salt of sodium or potassium; (2) lime chalk or like salt or compound of lime, and (3) carbon, and treat (out of contact of air) in a muffle or other furnace such as described later on, which furnace is heated with a reducing-flame. The muffle or furnace may be provided with a condensing-tube for condensing the emitted vapors. When the reaction is completed, the furnace is tapped and the charge run off. The lime is now found to have combined with the silica and the charge separates into three layers, metal at the bottom, a hard layer of silicate of lime, and a soft brittle layer of finely-divided zinc, zinc salts, and soda salts mixed. This latter is placed in another closed furnace and the zinc distilled off, though if a muffle be used in the first instance by leaving this slag in the muffle and simply raising the heat it can be distilled off from the reducing-furnace. In such case the heat is raised to a white heat in this furnace, and the pipe D is bent down into a condensing-chamber J. The metallic zinc will then escape in fumes and be condensed in the condensing-chamber. The remaining slag is tapped off and is lixiviated with water and the alkaline sulfid recovered. This latter can be reconverted into carbonate in any well-known manner for use in the first operation. If the slag contain small pellets of metal, it can, before lixiviation, be passed through rollers and treated in sieves to recover the metal.

In order that my invention may be more clearly understood, I append the accompanying drawings of my apparatus and the description of an actual charge, in which the sulfid ore analyzed approximately for metals twenty-five lead, twenty-five zinc, and in which there were about nineteen ounces of silver to the ton.

Figure 1 shows a vertical section, and Fig. 2 a plan. Fig. 3 illustrates in section a modification of a part of the construction, showing the pipe D bent down into the condensing-chamber J.

In the drawings, A is the bed of the furnace; B, working holes closed with doors; C, tapping-holes; D, exit-pipe for fumes and waste gases; E, admission-hopper for charge; F, grate; G, fire-box, and H admission-hopper for fuel.

The mode of working is as follows: The grate is kept loaded to the top with fuel and the furnace kept at a red heat. The charge consisting, approximately, of five of carbon, thirty of carbonate of soda, and five of lime to one hundred of ore such as described is fed in at E from time to time and acted on by the reducing-flame from the fire-box G. As the charge melts it runs down into the furnace, and the metal is from time to time tapped out. As the silicate-of-lime slag accumulates it is also occasionally in part tapped out, and from time to time the remaining zinc and soda slag is run into a closed furnace, where it is treated with metallic copper, the result being that a brass is formed and settles down in the bottom, or in place of this the slag can be strongly heated and the zinc distilled off in the usual manner of distilling zinc. The slag, freed from the zinc, is now broken up or while still hot thrown into water. It is then lixiviated and the solution of alkaline sulfid treated in any well-known manner to form alkaline carbonate for use in the first operation of the cycle; or the slag, after being run out of the furnace and allowed to cool, is separated from the metal and the hard insoluble lime portion by being immersed in water, whereby the soda salts are lixiviated out, and after the zinc has settled the liquor containing the soda salts is decanted and the zinc residue is dried and treated either by copper or distilled, as herein stated.

I claim as my invention—

1. The process of treating rebellious sulfid ores or mattes which consists in heating them by a reducing-flame to a red heat with a mixture of carbon, an alkali-metal salt such as described and lime in about the proportions used to form alkali metal thereby effecting the reduction of the ore by the nascent alkali metal and tapping out the metal.

2. The cycle of operations in the metallurgy of rebellious or complex sulfid ores or mattes containing zinc which consists in treating them by a reducing-flame at a red heat with carbonate of an alkali metal, carbon and a lime flux, thereby effecting the reduction of the ore by the nascent alkali metal tapping out the metal, separating the zinc, lixiviating the slag and converting the alkaline sulfid into alkaline carbonate for use in the first operation of the cycle.

3. The process of treating rebellious or complex sulfid ores or mattes containing zinc, which consists in heating the same to a red heat with soda, carbon and lime in a reducing-flame thereby effecting the reduction of the ore by the nascent alkali metal until most of the metals separate, then separating the zinc from the slag substantially as described.

4. In the process of treating rebellious or complex sulfid ores or mattes containing zinc and other metals, such as lead silver, gold, antimony, arsenic and silicon by means of carbon, alkali-metal carbonate, and the requisite flux reducing the major part of the metals contained therein and bringing the slag into contact with molten metallic copper, thereby forming an alloy containing zinc and copper.

5. In the process of treating rebellious or complex sulfid ores or mattes containing zinc, first reducing the lead and silver and some of the zinc by means of carbon, an alkali-metal salt such as described and calcareous matter such as described by a reducing-flame at a red heat, thereby effecting the reduction of the ore by the nascent alkali metal, then separating the zinc from the slag at a higher heat.

6. The process of treating rebellious sulfid ores or mattes, which consists in comminuting the ore or matte, intimately mixing with the comminuted mass, a compound of an alkali metal and a reducing agent, and exposing the mixture out of contact with the air to a red heat, thereby liberating the alkali metal, and by action of the nascent alkali metal, reducing the ore or matte without previously fusing it, the heating being carried out at a temperature insufficient to reduce the alkali metal in the absence of the ore or matte.

In testimony whereof I have signed my name to this specification in the presence of two subscribing witnesses.

JOHN ARMSTRONG.

Witnesses:
G. F. WARREN,
FRED. C. HARRIS.